United States Patent
Lee

(10) Patent No.: US 10,563,758 B2
(45) Date of Patent: Feb. 18, 2020

(54) TRANSMISSION APPARATUS AND METHOD FOR CRUISE CONTROL SYSTEM RESPONSIVE TO DRIVING CONDITION

(71) Applicants: Hyundai Motor Company, Seoul (KR); Kia Motors Corporation, Seoul (KR)

(72) Inventor: Jong Hyuck Lee, Hwaseong-si (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 204 days.

(21) Appl. No.: 15/820,937

(22) Filed: Nov. 22, 2017

(65) Prior Publication Data

US 2018/0266545 A1 Sep. 20, 2018

(30) Foreign Application Priority Data

Mar. 14, 2017 (KR) .................. 10-2017-0031704

(51) Int. Cl.
| | |
|---|---|
| F16H 61/02 | (2006.01) |
| F16H 59/24 | (2006.01) |
| F16H 59/50 | (2006.01) |
| F16H 59/66 | (2006.01) |
| F16H 59/44 | (2006.01) |

(52) U.S. Cl.
CPC ...... *F16H 61/0213* (2013.01); *B60Y 2300/14* (2013.01); *B60Y 2300/143* (2013.01); *B60Y 2300/16* (2013.01); *F16H 59/24* (2013.01); *F16H 59/44* (2013.01); *F16H 59/50* (2013.01); *F16H 59/66* (2013.01); *F16H 2059/666* (2013.01); *F16H 2061/0227* (2013.01)

(58) Field of Classification Search
CPC ...... F16H 61/0213; F16H 59/24; F16H 59/44; F16H 59/50; F16H 2061/0227
See application file for complete search history.

(56) References Cited

U.S. PATENT DOCUMENTS

| | | | |
|---|---|---|---|
| 5,895,435 A * | 4/1999 | Ohta | F16H 61/0213 477/120 |
| 8,063,755 B2 | 11/2011 | Eikelenberg et al. | |
| 2004/0225430 A1 * | 11/2004 | Bothe | F16H 59/0204 701/52 |

(Continued)

FOREIGN PATENT DOCUMENTS

| | | |
|---|---|---|
| JP | H05-213092 A | 8/1993 |
| JP | 2003-343305 A | 12/2003 |

(Continued)

*Primary Examiner* — Edwin A Young
(74) *Attorney, Agent, or Firm* — Morgan, Lewis & Bockius LLP

(57) ABSTRACT

A method for controlling a transmission provided in a vehicle may include providing a reference data for automatic shift of the transmission according to a speed reference of the vehicle, collecting a detected data delivered from at least one detector or operation state information related to an in-vehicle device, wherein the at least one detector and the in-vehicle device is attached or mounted on the vehicle configured for recognizing a driving condition, determining a mode for the automatic shift based at least on the detected data or the operating state information, and performing the automatic shift according to the mode.

18 Claims, 9 Drawing Sheets

(56) References Cited

U.S. PATENT DOCUMENTS

2004/0230348 A1* 11/2004 Mann .................. B60R 25/2081
  701/1
2008/0146407 A1*  6/2008 Tuckfield ............... B60K 6/365
  477/34
2015/0210281 A1  7/2015 Johansson et al.

FOREIGN PATENT DOCUMENTS

| KR | 10-2009-0078954 A | 7/2009 |
| KR | 10-1469670 B1 | 12/2014 |
| KR | 10-1500259 B1 | 3/2015 |
| KR | 10-1558690 B1 | 10/2015 |

* cited by examiner

| Road Type/Location | Mode |
|---|---|
| Highway | Sports |
| Local Road | Normal |
| Urban Road | Comfort |

| Weather/Windshield Wiper | Mode |
|---|---|
| Clean | Sports |
| Rain | Normal / Comfort |
| Heavy Rain | Comfort |

| Distance from preceding vehicle (or object) | Mode |
|---|---|
| None | Sports |
| Close, High Frequent | Normal |
| Close, Low Frequent | Comfort |

FIG. 5

TRANSMISSION APPARATUS AND METHOD FOR CRUISE CONTROL SYSTEM RESPONSIVE TO DRIVING CONDITION

CROSS-REFERENCE TO RELATED APPLICATION

The present application claims priority to Korean Patent Application No. 10-2017-0031704, filed on Mar. 14, 2017, the entire contents of which is incorporated herein for all purposes by this reference.

BACKGROUND OF THE INVENTION

Field of the Invention

The disclosure relates to a transmission control device, and more, to an apparatus and a method for controlling an operation of gearbox/transmission based at least on driver's condition and surrounding condition while a vehicle operates in autonomous mode or is controlled by a cruise control system.

Description of Related Art

To assist a driver, the cruise control system mounted on the vehicle may perform cruise control through acceleration control of vehicle to follow a target speed set by the driver. Furthermore, using a forward detector that can recognize another vehicle or an object (obstacles) ahead of the cruise controlled vehicle, the cruise control system may decelerate or accelerate the vehicle to maintain a proper distance from the preceding vehicle. Using data or information related to a distance and a relative speed between the cruise controlled vehicle and the preceding vehicle and a direction angle of the cruise controlled vehicle, which are gathered or obtained by a front radar detector of the vehicle, and limitation or restriction about a longitudinal velocity and a predetermined acceleration of the cruise controlled device, the cruise control system can control an acceleration control device, an engine control device, and a braking control device included in the cruise controlled vehicle. As the vehicle speeds up and down, the cruise control system can control a vehicle-mounted transmission/gearbox to deliver power generated from an engine into wheels properly. In a case of a control system provided in a vehicle capable of autonomous travel, it is necessary to change a shift pattern in accordance with a driving condition.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing an apparatus and a method for reducing a down shift, according to driving condition, in a shift control that occurs when a speed of vehicle is controlled by at least one of a cruise control system and an autonomous control device, which are provided in the vehicle to assist a driver.

Furthermore, the disclosure can provide an apparatus and method for generating and controlling an acceleration torque based at least on driver's situation by controlling a shift condition in a response to driver's condition and a surrounding situation in an acceleration state.

Furthermore, the disclosure provides a device and a method for controlling the shift condition based on driver's condition and a surrounding situation to lessen or reduce driver's or occupant's inconvenience in a process of controlling a vehicle through the cruise control system or the autonomous control device A method for controlling a transmission provided in a vehicle may include providing a reference data for automatic shift of the transmission according to a speed reference of the vehicle; collecting a detected data delivered from at least one detector or operation state information related to an in-vehicle device, wherein the at least one detector and the in-vehicle device is attached or mounted on the vehicle configured for recognizing a driving condition; determining a mode for the automatic shift based at least on the detected data or the operating state information; and performing the automatic shift according to the mode.

The performing the automatic shift may include determining a requested acceleration according to the mode when a request for increasing a vehicle speed is entered; converting the requested acceleration into a torque demand; and performing the automatic shift corresponding to the torque demand according to the reference data.

The reference data can be configured to determine a timing point of the automatic shift according to a condition including the vehicle speed and a throttle value opening amount, and the reference data varies depending on a running mode of the vehicle.

The running mode of the vehicle may include at least one of a first mode that gives a priority to a driving force of the vehicle and a second mode that gives a priority to a fuel efficiency of the vehicle, and a third mode in which there is no priority to both the driving force and the fuel efficiency.

The at least one detector may include a detector configured to collect neighboring vehicle/obstacle information related to the vehicle, wherein the detector is disposed in at least one of a front, a side, and a rear of the vehicle.

Based at least on the neighboring vehicle/obstacle information recognized by the detector, the mode is changed when the number of neighboring vehicles/obstacles which are ahead of the vehicle during a predetermined time is greater than a predetermined number.

The method can further comprise collecting road information, location information, and driving restriction information while the vehicle is traveling, with respect to the driving condition, through a navigation device mounted on or linked to the vehicle; and determining the mode in a response to the road information, the location information, and the driving restriction information.

The mode may include a first mode selected when the road information is a highway; a second mode selected when the road information is a local road; and a third mode selected when the road information is a urban road.

The in-vehicle device may include a windshield wiper. Herein, the mode may include a third mode selected when the windshield wiper operates in a high speed mode; a second mode selected when the windshield wiper operates in a low speed mode; and a first mode selected when the windshield wiper does not operate.

The mode can be determined in a response to the detected data first, and adjusted or changed in a response to the operation state information.

The mode can be determined in a response to the operation state information first, and adjust or changed in a response to the detected data.

The method can further comprise determining or changing the mode corresponding to an inputted value entered through an interface disposed in a head unit of the vehicle.

An apparatus for controlling a transmission provided in a vehicle may include a powertrain control device configured to provide a reference data for automatic shift of the transmission according to a speed reference of the vehicle; and a smart driving control device configured to collect a detected data delivered from at least one detector or operation state information related to an in-vehicle device and to determine a mode for the automatic shift based at least on the detected data or the operating state information. Herein, the automatic shift is performed according to the mode, and the at least one detector and the in-vehicle device is attached or mounted on the vehicle configured for recognizing a driving condition.

The apparatus can further comprise an electronic stability control system configured to convert a requested acceleration generated according to the mode into a torque demand. Herein, the powertrain control device can perform the automatic shift in a response to the torque demand, referring to the reference data.

The smart driving control device can generate the requested acceleration according to the mode when a request for increasing a vehicle speed is entered.

The reference data can be configured to determine a timing point of the automatic shift according to a condition including the vehicle speed and a throttle value opening amount. Herein, the reference data can vary depending on a running mode of the vehicle. The reference data is included in the powertrain control device or stored in a memory engaged with the powertrain control device.

The at least one detector may include a detector configured to collect neighboring vehicle/obstacle information related to the vehicle. Herein, the detector can be disposed in at least one of a front, a side, and a rear of the vehicle.

When the number of neighboring vehicles/obstacles which are ahead of the vehicle during a predetermined time is greater than a predetermined number, the mode can be changed based on the neighboring vehicle/obstacle information recognized by the detector.

The smart driving control device can be further configured to collect road information, location information, and driving restriction information while the vehicle is traveling, with respect to the driving condition, through a navigation device mounted on or linked to the vehicle, and to determine the mode in a response to the road information, the location information, and the driving restriction information.

The in-vehicle device may include a windshield wiper. Herein, the mode may include a third mode selected when the windshield wiper operates in a high speed mode; a second mode selected when the windshield wiper operates in a low speed mode; and a first mode selected when the windshield wiper does not operate.

An apparatus for controlling a transmission provided in a vehicle may include a processing system that includes at least one data processor and at least one computer-readable memory storing a computer program. Herein, the processing system is configured to cause the apparatus to provide a reference data for automatic shift of the transmission according to a speed reference of the vehicle; collect a detected data delivered from at least one detector or operation state information related to an in-vehicle device, wherein the at least one detector and the in-vehicle device is attached or mounted on the vehicle configured for recognizing a driving condition; determine a mode for the automatic shift based at least on the detected data or the operating state information; and perform the automatic shift according to the mode.

Advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure pointed out in the written description and claims hereof as well as the appended drawings.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 5 describes an example of how to determine a mode;

Figure 1:
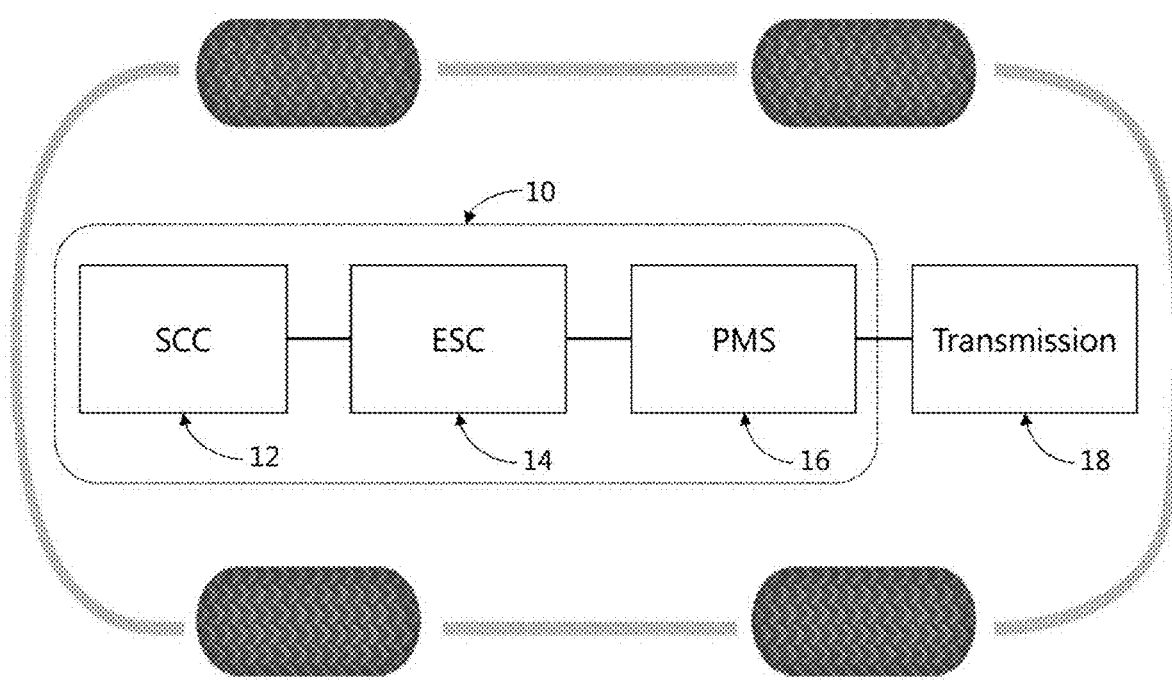
FIG. 1 shows a first example of at least one device controlling a transmission/gearbox included in a vehicle.

It may be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Reference will now be made more specifically to the exemplary embodiments of the invention, examples of which are illustrated in the accompanying drawings. In the drawings, the same elements are denoted by the same reference numerals, and a repeated explanation thereof will not be given. The suffixes "module" and "unit" of elements herein are used for convenience of description and thus can be used interchangeably and do not have any distinguishable meanings or functions.

The terms "a" or "an", as used herein, are defined as one or more than one. The term "another", as used herein, is defined as at least a second or more. The terms "including" and/or "having" as used herein, are defined as comprising (i.e. open transition). The term "coupled" or "operatively coupled" as used herein, is defined as connected, although not necessarily directly, and not necessarily mechanically.

In the description of the invention, certain detailed explanations of related art are omitted when it is deemed that they may unnecessarily obscure the essence of the invention. The features of the invention will be more clearly understood from the accompanying drawings and should not be limited by the accompanying drawings. It is to be appreciated that all changes, equivalents, and substitutes that do not depart from the spirit and technical scope of the invention are encompassed in the invention.

A vehicle having an automatic shift function to enhance driver's convenience can automatically perform a upshift operation or a downshift operation in a response to a predetermined shift pattern based on a vehicle speed and an opening amount of throttle valve. Herein, the upshift operation means that the transmission (a gear stage) shifts in a direction, which is suitable from a low speed to a high speed (acceleration). In the other way, the downshift operation means that the transmission shifts in the other direction, which is suitable from a high speed to a lower speed (deceleration). The shift pattern can be designed to efficiently deliver a force generated from an engine or a motor into a wheel shaft. The shift pattern has been studied as a means for enhancing fuel efficiency. However, with the development of various technologies for use in the vehicle, vehicle performance requested by a driver keeps increased and complicate. There are some cases where the driver feels uncomfortable or dissatisfied with a conventional automatic shift pattern collectively applied to any driving situation while the vehicle operates. When a powertrain may be properly controlled, the performance required by the driver can be satisfied.

The signal of the accelerator position sensor (APS), which can generated when the driver acts to change a vehicle speed and a driving force may be considered driver's intention to change output performance of driving wheels in the vehicle. However, the driver can only recognize movement of the vehicle on which he or she is present, and could not know how much the kinetic energy generated in the vehicle is delivered into the wheels. When the driver increases the amount of an accelerator pedal (i.e., works the accelerator pedal), a requested power and an actual outputted power of the engine or the motor, which is used as a power source, are different because of time delay and lack of performance. This causes an error or a gap between user's expected power and an actual power required to satisfy user's expected driving performance. The error or the gap may result in driver's dissatisfaction. To solve the present problem, there is a demand for a transmission/gearbox or a shift control device that modulates a power outputted from the driving source to be changed into a form desired by the driver.

FIG. 1 shows a first example of at least one device controlling a transmission/gearbox included in a vehicle.

As shown, an in-vehicle transmission control device 10 can control a transmission (or a gearbox) 18 provided in the vehicle. The in-vehicle transmission control device 10 can control a smart cruise control (SCC) device 12 configured to sense information related to object(s) ahead of the vehicle and to generate a requested acceleration, an electronic stability control (ESC) device 14 configured to perform a determination for converting the requested acceleration into a torque demand, and a powertrain management system (PMS) 16 configured to control an engine and the transmission to deliver the torque demand to wheels.

In a vehicle having an engine using fossil fuel as a power source, an engine output torque may vary depending on a relationship between an engine speed and a throttle value opening amount. Furthermore, in a vehicle including an automatic transmission, the engine output torque may vary depending on a phenomenon of torque increase and efficiency deterioration that may be caused due to an intrinsic performance of a torque converter in the vehicle. The transmission 18 may include a plurality of gear stages to efficiently deliver performance of the engine, e.g., generated power. The gear ratio of gear stages can be determined in consideration of the maximum speed of the vehicle, acceleration capability, a fuel consumption rate, and the like.

In the vehicle including the automatic transmission, the powertrain management system 16 can determine which gear stage is selected based on the vehicle speed and the throttle value opening amount as a factor or a variable. A shift map used for determining a proper gear stage corresponding to the vehicle speed and the throttle value opening amount can be set differently based at least on whether the maximum available output is utilized, whether a fuel consumption rate is minimized, and the like. For the way of example but not limitation, via an interface provided in a head unit or a center fascia in the vehicle, a driver can select one of a power mode configured to maximize an available output, a fuel saving mode configured to minimize the fuel consumption rate, and the like.

The electronic stability control device 14 can be configured to improve dynamic performance of the vehicle, and may include a stability control module, a torque demand and braking pressure control module, and a driving force distribution control module. The stability control module can receive statuses of ABS/TSC/ESC, a braking pressure, a vehicle speed, a desired yaw rate, a horizontal sliding angle, a horizontal sliding angular velocity, a road surface friction coefficient, or the like. The stability control module can generate a desired yaw angular velocity and a braking pressure signal. The torque demand and braking pressure control module can compare an actual yaw angular velocity of the vehicle with the desired yaw angular velocity transmitted by the stability control module to determine the difference therebetween to determine an oversteer an understeer, or the like. The electronic stability control device 14 can output the torque demand corresponding to the requested acceleration generated by the smart cruise control device 12.

The smart cruise control device 12 not only makes it possible to operate the vehicle at a vehicle speed set by the driver but also maintains a predetermined distance from the preceding vehicle recognized by a detector or a Lidar device mounted on the vehicle. For way of the example but not limitation, the smart cruise control device 12 can recognize the speed change of the preceding vehicle, and reduce a vehicle speed when the distance from the preceding vehicle becomes shortened. Conversely, if the speed of the preceding vehicle increases, the speed of the vehicle can be increased. The smart cruise control device 12 can reduce or increase a vehicle speed after recognizing a relative speed (i.e., speed difference) between the vehicle and the preceding vehicle through a detector or a Lidar device mounted on the vehicle.

According to an exemplary embodiment of the present invention, the smart cruise control device 12 can perform constant-speed running of the vehicle at a predetermined speed set by the driver when there is no preceding vehicle. Furthermore, when the preceding vehicle exists, acceleration and deceleration can be performed to maintain a predetermined distance from the preceding vehicle. When the preceding vehicle is disappeared, the smart cruise control device 12 can restore a vehicle speed at the speed set by the driver and perform the constant-speed running. Furthermore, the smart cruise control device 12 may stop the vehicle when the preceding vehicle stops, and may accelerate the vehicle up to the predetermined speed set by the driver when the preceding vehicle moves.

The smart cruise control device 12 can be configured to use the relative speed and the relative distance with the preceding vehicle to determine the required acceleration for each acceleration and deceleration situation. A torque coordinator converts the required acceleration into the torque demand and delivers the torque demand into a deceleration and acceleration controller. The deceleration and acceleration controller can receive the torque demand and perform an operation in a response to the torque demand. For example, the deceleration and acceleration controller can change a gear stage of the transmission 18 according to a tuning (mapping) shift pattern predetermined in the powertrain management system 16. In the instant case, the transmission in the vehicle can be automatically shifted without consideration of driver's propensity and surrounding environment including a driving condition. For example, unlike driver's intention, a transmission shift including a downshift operation or the like may occur in a situation where the driver does not want transmission shift. If the transmission shift may occur regardless of driver's intention, the driver may feel like a jerk which is sudden and not smooth, which can affect a driving quality.

Figure 2:
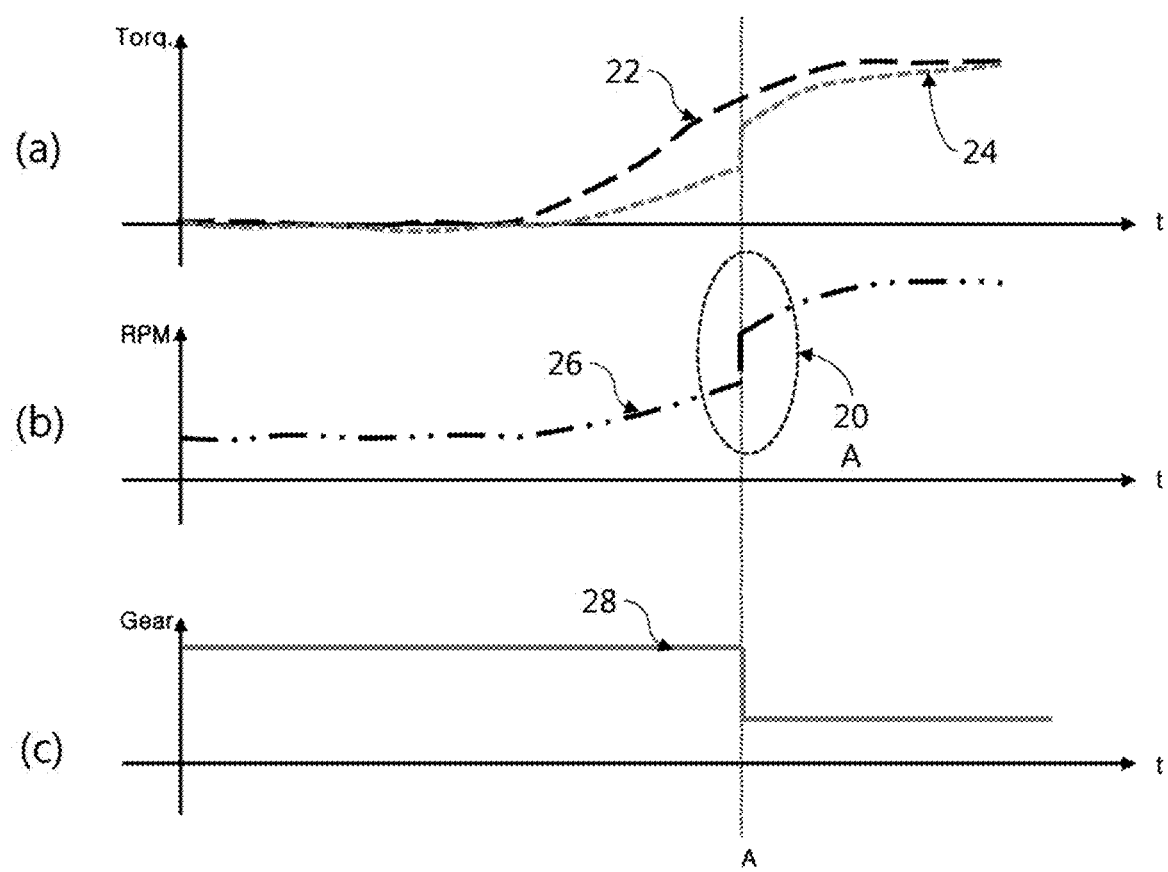
FIG. 2 describes a down shift of the transmission or the gearbox.

FIG. 2 describes a down shift of the transmission or the gearbox. Particularly, (a) shows a change of torque, (b) shows a change of revolutions per minute (RPM), and (c) shows a change of gear stage.

When the requested acceleration torque 22 increases, an energy management system (EMS) included in a vehicle may determine that the current gear stage of the transmission cannot deliver the torque demand properly. As such, the energy management system can perform transmission shift based on a predetermined shift map to generate or deliver the torque demand properly. The transmission shift for satisfying the torque demand, i.e., the downshift operation 28, is performed at the specific timing A so that the change of torque 24 is occurred as well as the change of revolutions per minute (RPM) 26 is occurred dramatically 20A. A driver on a vehicle can become aware of the large change in revolutions per minute (20A) as a jerk.

Figure 3:
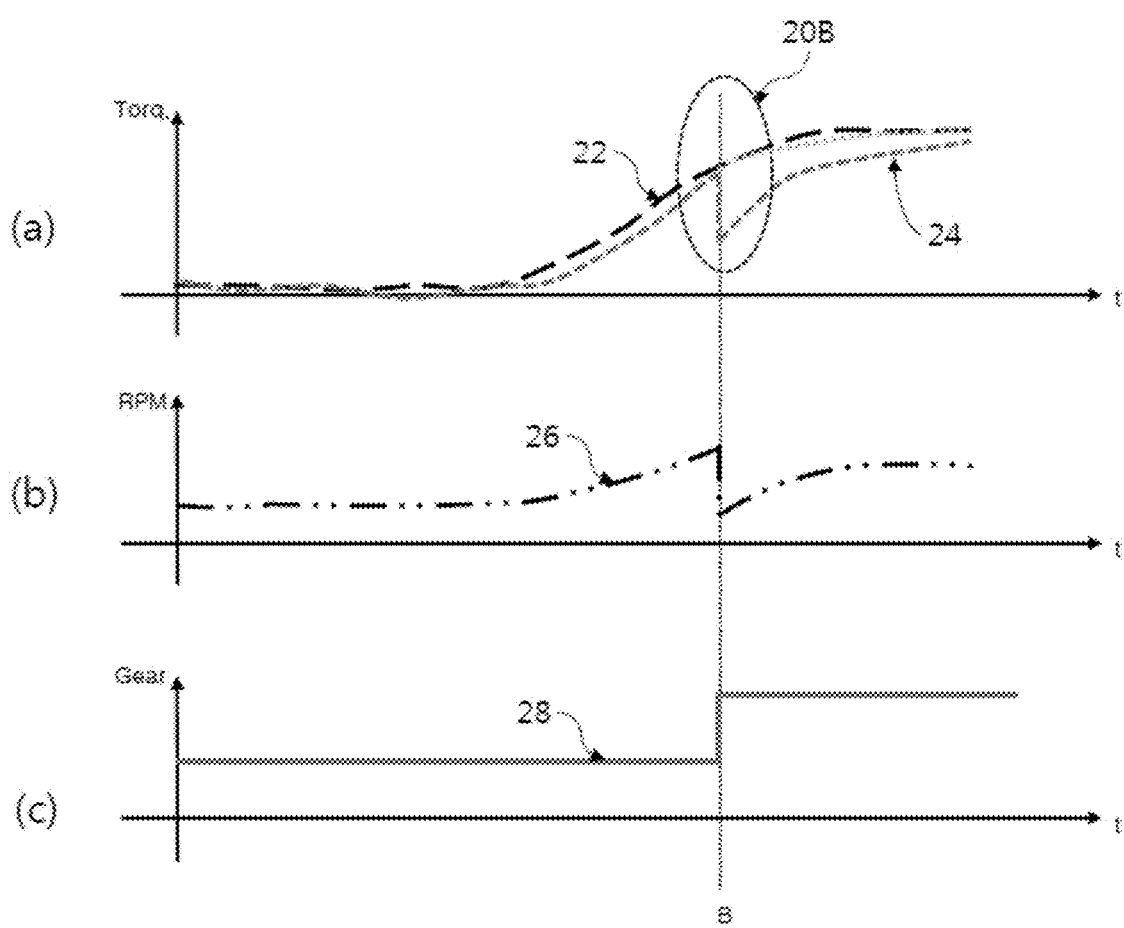
FIG. 3 describes an up shift of the transmission or the gearbox.

FIG. 3 describes an up shift of the transmission or the gearbox. Particularly, (a) shows a change of torque, (b) shows a change of revolutions per minute (RPM), and (c) shows a change of gear stage.

The revolutions per minute (RPM) 26 can be increased when the requested acceleration torque 22 increases. When the revolution per minute 26 reaches a certain level or the torque 24 is at a certain level, a gear stage of the transmission can be shifted based on a predetermined shift map. When the change of the gear stage, that is, the upshift operation 28, occurs at a specific timing B, the change in revolution per minute RPM 26 and the change in torque 24 can occur. In the instant case, a phenomenon 20B in which the torque is temporarily lowered due to the upshift operation, and a driver aboard the vehicle can feel the phenomenon 20B as a jerk.

Figure 4:
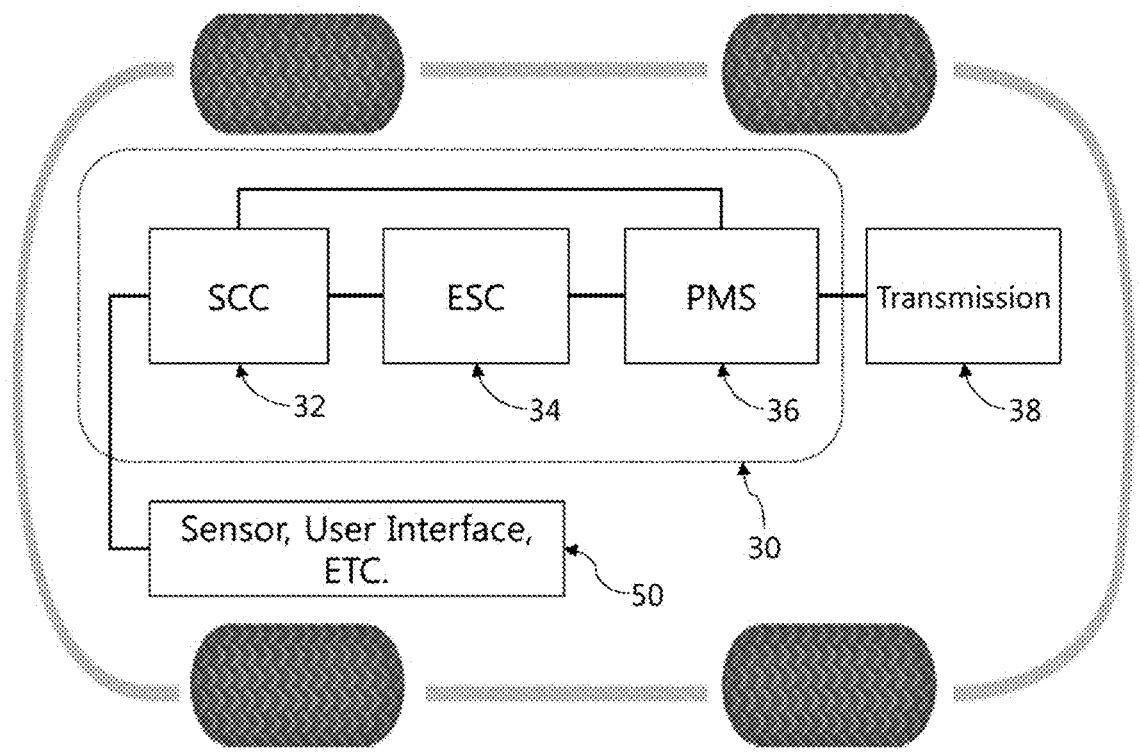
FIG. 4 shows a second example of at least one device controlling the transmission/gearbox included in the vehicle.

FIG. 4 shows a second example of at least one device controlling the transmission/gearbox included in the vehicle.

As shown, an in-vehicle transmission control device 30 mounted on the vehicle can control a transmission 38. The in-vehicle transmission control device 30 can sense and recognize a driving condition or environment through an in-vehicle device 50 including a detector, a user interface, or the like. The in-vehicle device 50 including the detector, the user interface and etc., may include at least one detector or a device mounted on or attached to the vehicle. For the way of example but not limitation, the in-vehicle device 50 facilitating vehicle's driving condition or environment may include a detecting device configured for detecting obstacles or other vehicles in the vicinity of the vehicle, i.e., front, rear and side of the vehicle, a windshield wiper which may be operated in a rainy condition, a head lamp configured to operate in dark environment, a navigation device mounted on the vehicle and configured for providing map information, location information, and the like.

The in-vehicle transmission control device 30 may include a powertrain control device 36 configured to provide a reference data for an automatic transmission shift of the transmission according to a speed of the vehicle, and a smart cruise control device 32 configured to collect a detected data obtained from at least one detector mounted on the vehicle configured for recognizing the driving environment or operation state information related to the in-vehicle device 50 attached to the vehicle and to determine a mode for automatic transmission based on the detected data or the operation state information.

According to the mode determined by the smart cruise control device 32, the powertrain control device 36 can perform the automatic shift. The powertrain control device 36 can store the minimum and maximum values of the torque possibly delivered at each of the gear stage that can be determined according to the speed of the vehicle.

The in-vehicle transmission control device 30 may further include an electronic stability control device 34 configured to convert a requested acceleration determined according to the mode determined by the smart cruise control device 32 into a required torque. When driver's request for increasing the vehicle speed is generated, the smart cruise control device 32 can be configured to output the requested acceleration to the electronic stability control device 34 in accordance with the mode. The electronic stability control device 34 can output the required torque corresponding to the requested acceleration. In a response to the required torque output from the electronic attitude control device 34, the powertrain control device 36 can perform the automatic shift of the transmission 38 based at least on the reference data including the transmission map.

The reference data including the transmission map for automatic transmission may be included in the powertrain control device 36 or stored in a storage device associated or engaged with the powertrain control device 36. The reference data may include information related to a timing of the automatic shift according to conditions including the vehicle speed and the throttle value opening amount. The timing of automatic shifting may be determined by different criteria for each gear stage. For the way of example but not limitation, the timing of shifting to an upper gear stage can be determined based at least on a line of driving force for the maximum driving performance.

The reference data may be different depending on a running (driving) mode of the vehicle. The running mode of the vehicle may include at least one of a power mode that prioritizes the driving force of the vehicle, a fuel saving mode (economical mode) that prioritizes the fuel efficiency of the vehicle, and a normal mode in which the driving force and the fuel efficiency are not weighted. In the power mode or the fuel consumption mode, it is possible to determine a point at which the driving force line of the engine meets the fuel consumption rate curve as the timing for automatic shift. For example, determining the timing for automatic shift can be optimal at an engine operating point of the moment only when the vehicle moves at a constant speed. However, since there is a slight chance that the vehicle operates at a constant speed while the vehicle moves in real, it is difficult to ignore the amount of kinetic energy consumed for accelerating and decelerating the vehicle. Accordingly, it is possible to obtain a vehicle driving force based on performance of the power source, to derive a vehicle acceleration by applying a driving resistance, and to determine a shifting timing for reflecting a driving status according to the opening amount of the throttle valve.

Figure 6A:
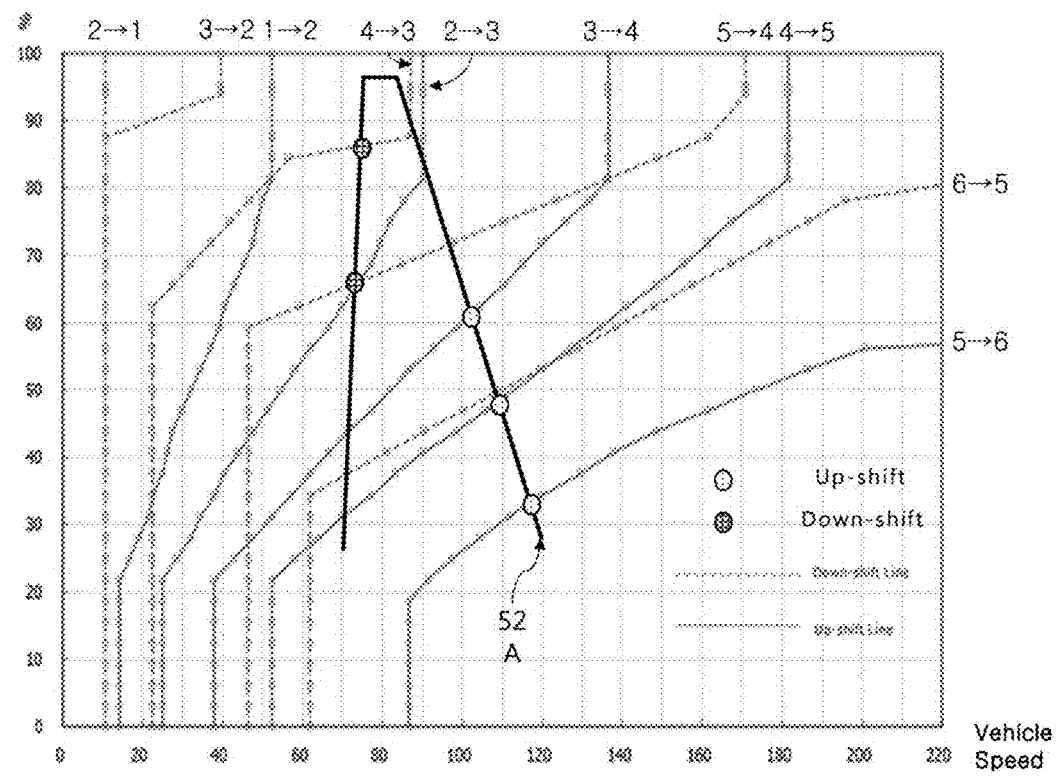
FIG. 6A, FIG. 6B, and FIG. 6C shows examples of automatic shifting according to the mode.
Figure 6B:
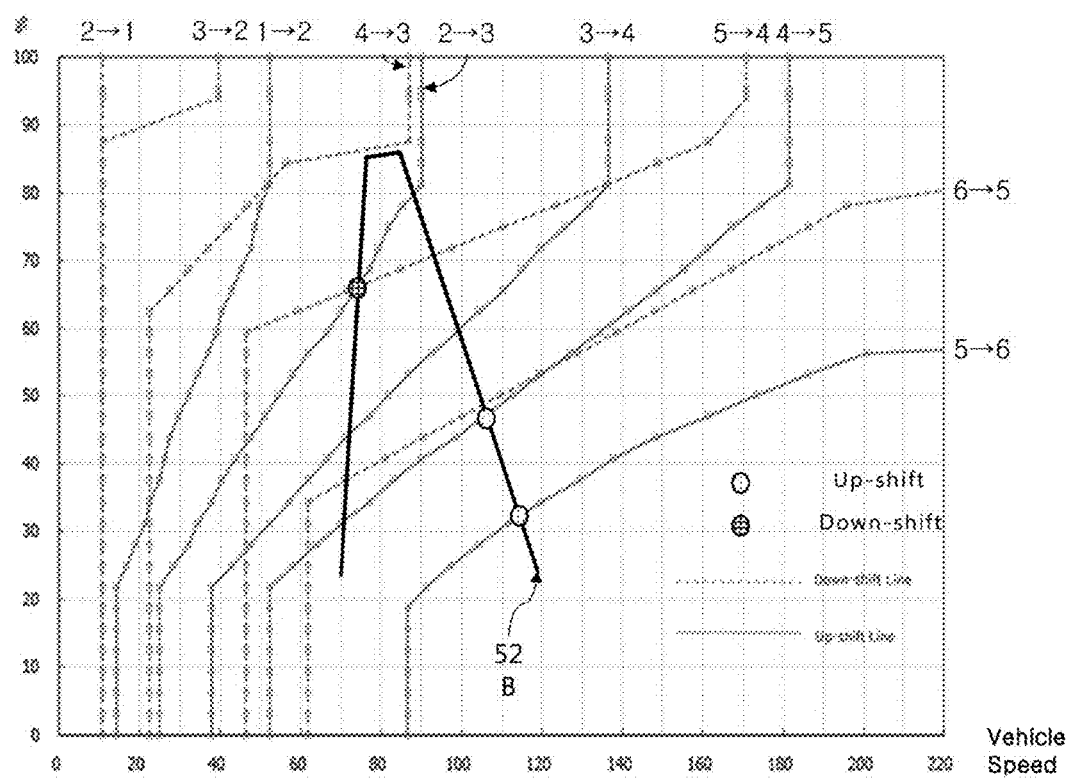
Figure 6C:
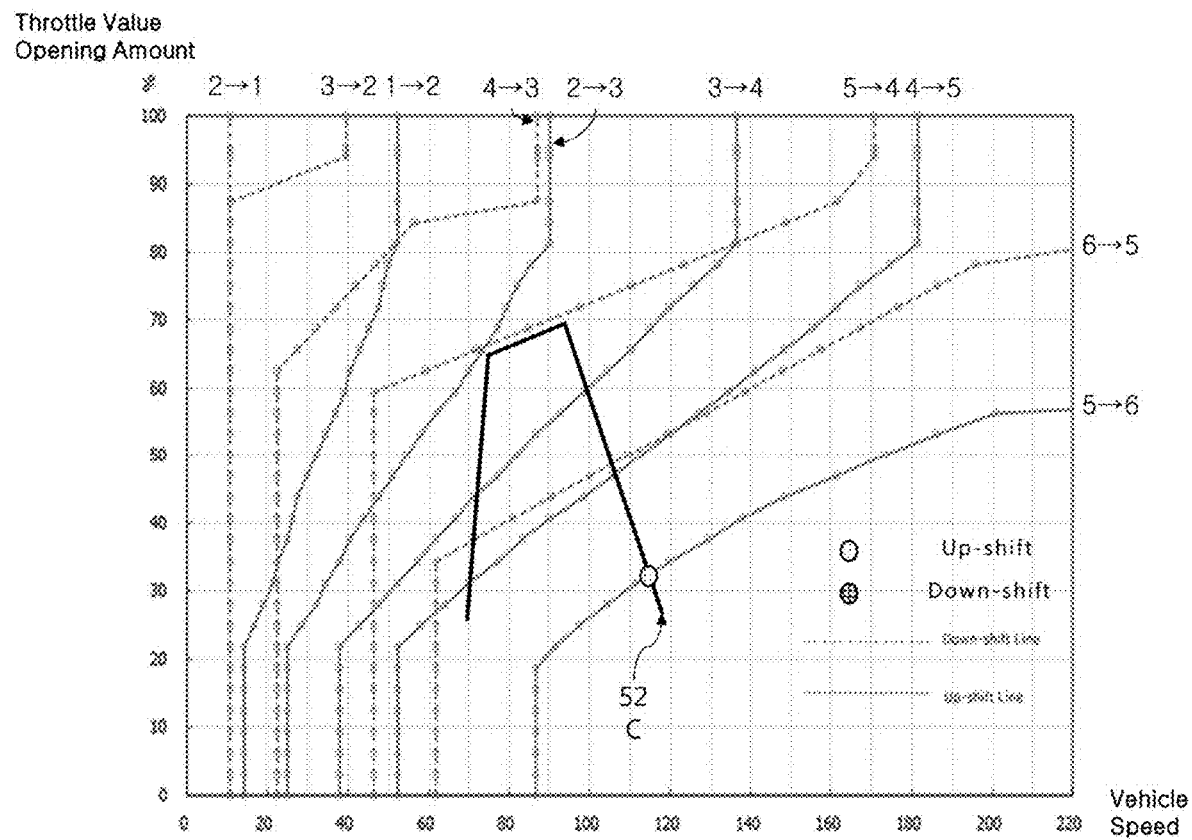

The amount of the accelerator pedal that reflects the driver's intention is related to running performance of the vehicle. A gear stage can be chosen depending on a degree of stepping on the accelerator pedal, so that an upshift or downshift operation may be occurred near a shift point. If the upshift and downshift operations between upper and lower gear stages were occurred at the same criteria, transmission shift may be occurred frequently and driver's uncomfortable shock can be occurred frequently. Therefore, timings of the upshift and the downshift operations (criteria for automatic shift) can be set differently. Such reference data can lead to a two-dimensional shift map as shown in FIG. 6A, FIG. 6B, and FIG. 6C.

The in-vehicle transmission control device 30 can recognize a driving condition or environment through the in-vehicle device 50 including a detector, a user interface or etc., which can be mounted on the vehicle, and determine the mode according to the driving condition or environment and the transmission shift to enhance driving sensitivity and safety. In a case of controlling acceleration based on the requested acceleration and the required torque, a transmission shift may be occurred frequently. Even though it may occur a dissatisfactory case in a view of driving sensitivity may arise, recognizing the driving condition or environment and implementing a shifting pattern fitting on driver's habit can enhance or improve driving sensitivity and safety.

FIG. 5 describes an example of how to determine a mode.

First, (a) in FIG. 5 shows a case where the mode can be determined according to a road on which a vehicle operates and a position of the vehicle. The smart cruise control device 32 (see FIG. 4), configured to determine the mode, can receive a data regarding a driving condition or environment from a navigation device mounted on the vehicle or engaged with the vehicle. The vehicle can collect road information, location information, and driving restriction information regarding the driving condition or environment, and determine the mode in a response to at least one of the road information, the location information, and the driving restriction information. For the way of example but not limitation, when the road information is a highway, the smart cruise control device 32 may determine a sports mode. When the road information is a local road, the smart cruise control device 32 may determine a normal mode. The smart cruise control device 32 can determine a comfort mode when the road information is an urban road.

Referring to (b) in FIG. 5, through a driving condition or environment including weather information transmitted through a navigation device or a communication terminal or an operation state of a windshield wiper mounted on a vehicle, it can be determined or recognized whether a snow or a rain falls and whether it is severely falling. For the way of example but not limitation, when the windshield wiper operates in a high speed mode, the smart cruise control device 32 operates in a comfort mode. When the windshield wiper does not operate, the smart cruise control device 32 operates in a sports mode. When the windshield wiper operates in a low speed mode, the smart cruise control device 32 operates in a normal mode.

Referring to (c) in FIG. 5, the smart cruise control device 32 configured to determine the mode can be disposed at least one of front, side and rear of the vehicle through at least one detector configured for gathering or transmitting information related to the driving condition or environment. Based on information related to neighboring vehicles or obstacles collected by a detector, the mode can be changed when the number of neighboring vehicles or adjacent obstacles located in front of the vehicle for a predetermined time exceeds a predetermined number. The smart cruise control device 32 can determine the mode as the sports mode when there is no preceding object or vehicle, as the comfort mode when a frequency of the preceding objects or vehicles is high in the vicinity, and as the normal mode when the frequency of the preceding vehicle is low in the vicinity.

Referring to (a) to (c) of FIG. 5, a method of setting the mode based on the travel information collected by the smart cruise control device 32 through the navigation system, the windshield wiper, the preceding vehicle detector, Other information may be collected about the environment in which the vehicle travels including from other devices mounted on the vehicle or interworking with the vehicle, module, and the mode may be determined based on the collected information.

Furthermore, the smart cruise control device 32 may determine a mode corresponding to the specific detecting data related to a driving condition or environment and re-adjust the determined mode based on the operation state information related to the device mounted on the vehicle. For the way of example but not limitation, when the vehicle moves on an expressway, the smart cruise control device 32 can determine a sport mode first, but can re-adjust the mode as a normal mode or a comfort mode when the windshield wiper operates. On the other hand, after the smart cruise control device 32 determines the sports mode in a response to the operating state information related to the windshield wiper, the smart cruise control device 32 may re-adjust the sports mode into the normal mode or the comfort mode if it is determined that the preceding vehicles or obstacles are too many.

According to an exemplary embodiment of the present invention, the smart cruise control device 32 may determine, re-adjust or change a mode corresponding to the value entered by the user via a user interface disposed in a head unit of the vehicle.

FIG. 6A, FIG. 6B, and FIG. 6C shows examples of automatic shifting according to the mode. FIG. 6A, FIG. 6B, and FIG. 6C are described on a basis of a two-dimensional shift map in which shift points are determined based on a vehicle speed and a throttle value opening amount. In FIG. 6A, FIG. 6B, and FIG. 6C, it is presumed that the vehicle includes a six-stage automatic transmission. When the vehicle currently runs at a speed of 70 Km/h at five stages and is requested to reach at 120 Km/h, a downshift operation can be occurred twice as well as an upshift operation can be occurred three times during vehicle's transmission shift period 52A.

FIG. 6A describes a case where the smart cruise control device 32 (see FIG. 4) is determined to be in a sports mode. When the vehicle running at the fifth stage is accelerated to a speed of 120 Km/h from a speed of 70 Km/h, there are performed three upshifts operations after two downshift operations in vehicle's transmission shift period 52A.

FIG. 6B shows a case where the smart cruise control device 32 is determined to be in a normal mode. When the vehicle currently operating at the fifth stage is accelerated to a speed of 120 Km/h from at a speed of 70 Km/h, two upshift operations after one downshift operation may be included in vehicle's transmission shift period 52B.

FIG. 6C illustrates a case where the smart cruise control device 32 has determined to be in the comfort mode. When the vehicle running at the fifth stage is accelerated to a speed of 120 Km/h from at a speed of 70 Km/h, one upshift operation without a downshift operation may be included in vehicle's transmission shift period 52C.

In a case when vehicle's automatic transmission is performed in a response to a mode determined by the smart cruise control device 32 based on a driving condition or environment, the generation of the downshift operation can be controlled. When a downshift operation does not occur during acceleration from a speed of 70 Km/h to a speed of 120 Km/h according to driver's intention, the number of upshift operations may also be reduced. If the number of shift operation can be reduced, the number of cases when a driver feels a jerk described in FIG. 2 and FIG. 3 is reduced. In such a case, driver's sensitivity with respect to the automatic transmission for driving can be improved, and driving safety can be achieved.

Figure 7:
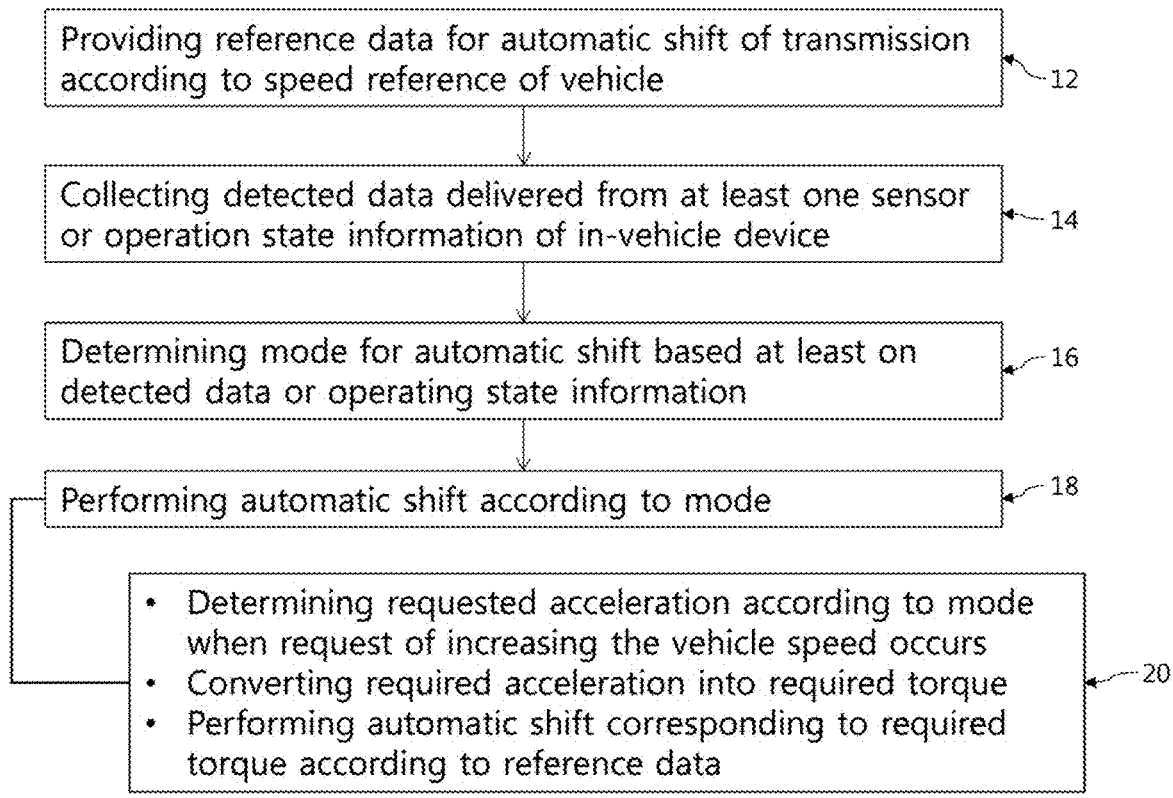
FIG. 7 describes a method for controlling a transmission included in a vehicle.

FIG. 7 describes a method for controlling a transmission included in a vehicle As shown, the method may include providing a reference data for automatic shift of the transmission according to a speed reference of the vehicle (step 12), collecting a detected data delivered from at least one detector or operation state information related to an in-vehicle device (step 14), determining a mode for the automatic shift based at least on the detected data or the operating state information (step 16), and performing the automatic shift according to the mode (step 18). Herein, the at least one detector and the in-vehicle device is attached or mounted on the vehicle configured for recognizing a driving condition.

The performing the automatic shift according to the mode (step 18) includes at least one of determining a requested acceleration according to a mode when a request of increasing the vehicle speed occurs (step 20), converting the required acceleration into a required torque (step 20), and performing an automatic shift corresponding to the required torque according to the reference data (step 20).

According to an exemplary embodiment of the present invention, a method for performing transmission shift may be executed through a computing device included in the in-vehicle transmission control device 30 (see FIG. 4) or a processing system including a processor and a memory. A powertrain management system (PMS), a smart cruise control (SCC) device, an electronic stability control device (ESC), and etc., which can be included in the in-vehicle transmission control device 30, may include at least one of a computing device, a processing system, or the like, respectively.

The reference data is used to determine automatic shift timing based on driving conditions including a vehicle speed and a throttle value opening amount. The reference data may be changed according to a running mode of the vehicle. The running mode of the vehicle is at least one of a first mode that gives a priority to a driving force of the vehicle and a second mode that gives a priority to fuel efficiency of the vehicle, and a third mode in which the driving force and the fuel consumption efficiency are not weighted.

At least one detector configured to deliver data about a driving condition or environment which can be used to determine the mode may comprise a detector configured to collect information related to surrounding vehicles/obstacles of the vehicle and disposed on at least one of the front, the side, and the rear of the vehicle. Also, the mode can be changed or adjusted when the number of neighboring vehicles or obstacles located in front of the vehicle for a predetermined time exceeds the predetermined number based on information related to the neighboring vehicles/obstacles recognized or gathered by the detector.

Also, the method for performing transmission shift in the vehicle may further include a step of collecting road information, location information, and driving restriction information that the vehicle is traveling with respect to a driving condition or environment through a navigation device mounted on or engaged with the vehicle, and determining a mode in a response to the road information, the location information, and the driving restriction information. For the way of example but not limitation, the mode may include a first mode selected when the road information is a highway, a second mode selected when the road information is a local road, and a third mode selected when the road information is an urban road.

Furthermore, in an in-vehicle transmission control method, a device attached to the vehicle may receive the operating state from a windshield wiper. For the way of example but not limitation, the mode may include a third mode selected when the windshield wiper operates at a high speed, a second mode selected when the windshield wiper operates at a low speed, and a second mode selected when the windshield wiper does not operate.

According to an exemplary embodiment of the present invention, after the mode is determined according to the detected data, the determined mode can be adjusted in a response to the operation state information. Conversely, after the mode is determined based on the operation state information first, the determined mode can be adjusted based on the detected data. The in-vehicle transmission control method may further include determining or changing a mode corresponding to the value entered through the interface disposed in the head unit of the vehicle.

As above described, embodiments according to the disclosure can release driver's or occupant's fatigue or discomfort occurred when an automatic transmission shift is done based on a mechanical or arithmetic analysis which may not reflect a driving condition or situation while a cruise control apparatus or an autonomous control apparatus mounted on a vehicle is used.

Furthermore, embodiments can perform shift control in a response to a driving environment to reduce a down shift, while the vehicle is accelerated by the cruise control apparatus or the autonomous control apparatus, so that it is possible to prevent, reduce or lessen situation that a driver or an occupant feels foreign, which may be caused by an automatic shift of a transmission.

The aforementioned embodiments are achieved by invention in a predetermined manner. Each of the structural combination of structural elements and features of the elements or features can be considered selectively unless specified separately. Each of the structural elements or features may be conducted without being combined with other structural elements or features. Also, some structural elements and/or features may be combined with one another to form the exemplary embodiments of the invention. The order of operations described in the exemplary embodiments of the invention may be changed. Some structural elements or features of one exemplary embodiment of the present invention may be included in another exemplary embodiment of the present invention, or may be replaced with corresponding structural elements or features of another exemplary embodiment. Moreover, it will be apparent that some claims referring to specific claims may be combined with another claims referring to the other claims other than the specific claims to form the embodiment or add new claims by amendment after the application is filed.

Various embodiments may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in a form of a carrier wave (for example, a transmission over the Internet).

For convenience in explanation and accurate definition in the appended claims, the terms "upper", "lower", "internal", "outer", "up", "down", "upper", "lower", "upwards", "downwards", "front", "rear", "back", "inside", "outside", "inwardly", "outwardly", "internal", "external", "internal", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A method for controlling a transmission provided in a vehicle, the method comprising:
    providing a reference data for automatic shift of the transmission according to a speed reference of the vehicle;
    collecting a detected data delivered from at least one detector or operation state information related to an in-vehicle device, wherein the at least one detector and the in-vehicle device are attached or mounted on the vehicle and configured for recognizing a driving condition;
    determining a mode for the automatic shift based at least on the detected data or the operation state information; and
    performing the automatic shift according to the mode,
    wherein the at least one detector includes a detector configured to collect neighboring vehicle or obstacle information related to the vehicle, wherein the detector is disposed in at least one of a front, a side, and a rear of the vehicle.

2. The method according to claim 1, wherein the performing the automatic shift includes:
    determining a requested acceleration according to the mode when a request for increasing a vehicle speed is entered;
    converting the requested acceleration into a torque demand; and
    performing the automatic shift corresponding to the torque demand according to the reference data.

3. The method according to claim 1, wherein the reference data is configured to determine a timing point of the automatic shift according to a condition including a vehicle speed and a throttle value opening amount, and the reference data varies depending on a running mode of the vehicle.

4. The method of claim 3, wherein the running mode of the vehicle includes:
    at least one of a first mode that gives a priority to a driving force of the vehicle, a second mode that gives a priority to a fuel efficiency of the vehicle, and a third mode in which there is no priority to the driving force and the fuel efficiency.

5. The method according to claim 1, wherein, based on the neighboring vehicle or obstacle information recognized by the detector, the mode is changed when a number of neighboring vehicles or obstacles which are ahead of the vehicle during a predetermined time is larger than a predetermined number.

6. The method according to claim 1, further including:
    collecting road information, location information, and driving restriction information while the vehicle is traveling, with respect to the driving condition, through a navigation device mounted on or linked to the vehicle; and
    determining the mode in a response to the road information, the location information, and the driving restriction information.

7. The method according to claim 6, wherein the mode includes:
    a first mode selected when the road information is on a highway;
    a second mode selected when the road information is on a local road having size narrower than the highway; and
    a third mode selected when the road information is on a urban road.

8. The method according to claim 1,
    wherein the in-vehicle device includes a windshield wiper, and
    wherein the mode includes:
        a third mode selected when the windshield wiper operates in a high speed mode;
        a second mode selected when the windshield wiper operates in a low speed mode; and
        a first mode selected when the windshield wiper does not operate.

9. The method according to claim 1, wherein the mode is determined in a response to the detected data first, and adjusted or changed in a response to the operation state information.

10. The method according to claim 1, wherein the mode is determined in a response to the operation state information first, and adjusted or changed in a response to the detected data.

11. The method according to claim 1, further including:
    determining or changing the mode corresponding to an inputted value entered through an interface disposed in a head unit of the vehicle.

12. An apparatus for controlling a transmission provided in a vehicle, the apparatus comprising:
- a powertrain control device configured to provide a reference data for automatic shift of the transmission according to a speed reference of the vehicle; and
- a smart driving control device configured to collect a detected data delivered from at least one detector or operation state information related to an in-vehicle device and to determine a mode for the automatic shift based at least on the detected data or the operation state information,
- wherein the automatic shift is performed according to the mode,
- wherein the at least one detector and the in-vehicle device are attached or mounted on the vehicle configured for recognizing a driving condition,
- wherein the at least one detector includes a detector configured to collect neighboring vehicle or obstacle information related to the vehicle, and
- wherein the detector is disposed in at least one of a front, a side, and a rear of the vehicle.

13. The apparatus according to claim 12, further including:
- an electronic stability control system configured to convert a requested acceleration generated according to the mode into a torque demand, and
- wherein the powertrain control device is configured to perform the automatic shift in a response to the torque demand, referring to the reference data.

14. The apparatus according to claim 13, wherein the smart driving control device generates the requested acceleration according to the mode when a request for increasing a vehicle speed is entered.

15. The apparatus according to claim 13, wherein the reference data is configured to determine a timing point of the automatic shift according to a condition including a vehicle speed and a throttle value opening amount, and
- wherein the reference data varies depending on a running mode of the vehicle, and
- wherein the reference data is included in the powertrain control device or stored in a memory engaged with the powertrain control device.

16. The apparatus according to claim 12, wherein, based on the neighboring vehicle or obstacle information recognized by the detector, the mode is changed when a number of neighboring vehicles or obstacles which are ahead of the vehicle during a predetermined time is greater than a predetermined number.

17. The apparatus according to claim 12, wherein the smart driving control device is further configured to collect road information, location information, and driving restriction information while the vehicle is traveling, with respect to the driving condition, through a navigation device mounted on or linked to the vehicle, and to determine the mode in a response to the road information, the location information, and the driving restriction information.

18. The apparatus according to claim 12,
- wherein the in-vehicle device includes a windshield wiper, and
- wherein the mode includes:
  - a third mode selected when the windshield wiper operates in a high speed mode;
  - a second mode selected when the windshield wiper operates in a low speed mode; and
  - a first mode selected when the windshield wiper does not operate.

* * * * *